United States Patent
Beer

(10) Patent No.: US 10,960,920 B2
(45) Date of Patent: Mar. 30, 2021

(54) DEVICE FOR OPERATING A STEERING SYSTEM, STEERING SYSTEM AND METHOD

(71) Applicant: Robert Bosch Automotive Steering GmbH, Schwäbisch Gmünd (DE)

(72) Inventor: Florian Beer, Schwäbisch Gmünd (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 411 days.

(21) Appl. No.: 15/756,135

(22) PCT Filed: Aug. 18, 2016

(86) PCT No.: PCT/EP2016/069572
§ 371 (c)(1),
(2) Date: Feb. 28, 2018

(87) PCT Pub. No.: WO2017/042009
PCT Pub. Date: Mar. 16, 2017

(65) Prior Publication Data
US 2018/0312192 A1    Nov. 1, 2018

(30) Foreign Application Priority Data
Sep. 9, 2015    (DE) .................. 10 2015 115 118

(51) Int. Cl.
*B62D 5/04*    (2006.01)

(52) U.S. Cl.
CPC ......... *B62D 5/0481* (2013.01); *B62D 5/0406* (2013.01)

(58) Field of Classification Search
CPC ..... B62D 5/0481; B62D 5/049; B62D 5/0493
See application file for complete search history.

(56) References Cited

U.S. PATENT DOCUMENTS

| 7,538,560 B2 * | 5/2009 | Hepner | G01R 31/317 |
| | | | 324/535 |
| 2007/0159755 A1 * | 7/2007 | Talbot | A61M 5/142 |
| | | | 361/115 |

(Continued)

FOREIGN PATENT DOCUMENTS

EP    0 215 984 B1    6/1990

OTHER PUBLICATIONS

International Search Report corresponding to PCT Application No. PCT/EP2016/069572, dated Oct. 18, 2016 (German and English language document) (5 pages).

*Primary Examiner* — Thomas G Black
*Assistant Examiner* — Sara J Lewandroski
(74) *Attorney, Agent, or Firm* — Maginot, Moore & Beck LLP

(57) ABSTRACT

A device for operating a steering system having at least one electrically operable actuator includes at least one carrier substrate on which a first electronics system and a second electronics system, which is at least partially redundant thereto, is arranged for operating the actuator. The at least one carrier substrate is sealed in a fluid-tight manner, at least in regions, by a protective coating. The first electronics system is sealed at least substantially by the protective coating, and the second electronics system is at least partially free of the protective coating.

8 Claims, 2 Drawing Sheets

(56) References Cited

U.S. PATENT DOCUMENTS

| | | | |
|---|---|---|---|
| 2010/0049403 A1* | 2/2010 | Gillman | H05K 5/064 |
| | | | 701/43 |
| 2017/0050669 A1* | 2/2017 | Asakura | B62D 5/0481 |
| 2018/0029636 A1* | 2/2018 | Sworowski | H02K 21/02 |
| 2018/0194390 A1* | 7/2018 | Goto | B62D 5/0484 |

* cited by examiner

DEVICE FOR OPERATING A STEERING SYSTEM, STEERING SYSTEM AND METHOD

This application is a 35 U.S.C. § 371 National Stage Application of PCT/EP2016/069572, filed on Aug. 18, 2016, which claims the benefit of priority to Serial No. DE 10 2015 115 118.9, filed on Sep. 9, 2015 in Germany, the disclosures of which are incorporated herein by reference in their entirety.

The disclosure concerns a device for operating a steering system that comprises at least one electrically operated actuator and with at least one carrier substrate, in particular a circuit board, on which a first electronic system and an at least partly redundant second electronic system for operating the actuator are disposed, wherein the at least one carrier substrate is sealed liquid-tight with a protective coating at least in some areas.

Further, the disclosure concerns a steering system with such a device and a method for operating the device and the steering system.

BACKGROUND

In order to facilitate driving a vehicle, in particular a motor vehicle, for the driver, it is known to use steering systems that produce an auxiliary steering torque electromotively or hydraulically that assists the driver when steering. For actuating electrical components of such steering systems, devices, in particular control units, are known that carry an electronic system on one or more carrier substrates that is embodied for operating an actuator for producing the auxiliary torque. Sealed plug connections, sealing of individual components of the electronic system, encapsulation of leadthroughs and similar are used to seek to prevent water from entering the housing of the control unit or at least to delay this for as long as possible. However, if water enters the housing of the control unit despite the constructional measures and passes to the circuit board, short-circuits or low-impedance shunts can be caused by the liquid that can result in shutting off the steering assistance.

In order to protect the components of an electronic system against the moisture, it is moreover already known to seal the electronic system liquid-tight with a protective coating at least in some areas in order to increase the availability of the electronic system in the event of water ingress into the housing by delaying the effect of the water as much as possible. To increase operating reliability, it is moreover known to provide the electronic system in a redundant form, so that two at least substantially identical electronic systems are disposed on one or more carrier substrates, in particular circuit boards. As a result, however, only electronic defects of the electronic system can be captured. The two-channel or redundant system is not particularly robust against a mechanical malfunction of a seal without further measures.

SUMMARY

The object of the disclosure is thus to provide a device, a steering system and a method for operating the same that increase the robustness of the steering system against water ingress in a simple way.

The device according to the invention with the features of claim 1 has the advantage that a high degree of robustness of the device against the effects of water is ensured, wherein the ingress or presence of water or liquid is detected and yet the actuator can continue to be operated. According to the invention, it is provided for this purpose that the first electronic system is at least substantially sealed by the protective coating and that the second electronic system is at least substantially without a protective coating. Thus, a device is provided with which the first electronic system is protected against water ingress by the sealing and the second electronic system is not protected or is hardly protected. As a result, it is possible by means of the second electronic system to detect water ingress into the device or into the control unit in a timely manner and to continue to operate the first electronic system owing to the sealing against water ingress. However, the point in time of the water ingress is then known and it can be estimated how long the first electronic system can continue to operate reliably before the sealing itself is damaged by the water. Thus, despite water ingress the device can initially continue to be operated and measures can be initiated that ensure operation of the device by the first electronic system for as long as possible. Thus for example, the first electronic system can be switched to an emergency mode on detecting water ingress and can optionally output a warning message to the driver of the vehicle that notifies him that the device is in an emergency mode and that in particular a workshop visit is required. At least the second electronic system preferably comprises a device for detecting a short-circuit or a low-impedance shunt that is produced by a liquid, which on detecting a short-circuit or low-impedance shunt outputs a warning message and switches on the emergency mode of the first electronic system. By detecting short-circuits or low-impedance shunts, it is possible to detect the presence of moisture or liquid in a simple way.

Furthermore, it is preferably provided that at least the second electronic system comprises a sensor device without a protective coating for detecting liquid. The second electronic system thus comprises a device that is specially prepared for detecting liquid or moisture, which in particular already detects moisture/liquid before the occurrence of a short-circuit or a low-impedance shunt. As a result, the second electronic system can be deactivated in a timely manner and the first electronic system can be switched into the emergency mode for example.

According to a preferred development of the invention, it is provided that each electronic system comprises a sensor device for detecting moisture. If in principle the detection of moisture can also be carried out by monitoring the respective electronic system for occurring short-circuits or low-impedance shunts, the moisture can be detected in a timely manner and reliably by providing a sensor device, so that in particular the second electronic system can be deactivated before the occurrence of short-circuits or low-impedance shunts. Once said water ingress has been detected, the second electronic system is deactivated and the first electronic system is switched into the emergency mode. The remaining operating duration can then for example be temporally limited to a safe value, during which it can be assumed that water ingress has not penetrated or damaged the sealing. If both electronic systems comprise a respective sensor device, the continued operation of the first electronic system can be carried out depending on the data of the sensor device thereof.

According to a preferred development of the invention, it is provided that the sensor device of the first electronic system is sealed by the protective coating and the sensor device of the second electronic system has no protective coating. As a result, it is ensured that the moisture or the water ingress into the device is reliably detected by the sensor device of the second electronic system and the resistance of the protective coating of the first electronic system can also be reliably detected.

Furthermore, it is preferably provided that the first electronic system and the second electronic system comprise at least one commonly used component that is sealed by the protective coating. Thus for example, it can be provided that the first electronic system and the second electronic system share certain resources. In this case, the shared resource or component can advantageously be sealed with the protective coating to ensure long-term use of the component even in the event of water ingress.

The component is preferably a sensor or an energy source of the device. Thus, the component can for example be a torque sensor or revolution rate sensor of the steering system, or an energy source, such as for example a battery, which for example can maintain the continued operation of the steering system for at least a certain time in an emergency mode in the event of failure of a power supply.

Furthermore, it is preferably provided that the device comprises at least one control unit that deactivates the second electronic system if the sensor device of the second electronic system detects moisture or water ingress. As a result, as already mentioned above a short-circuit or low-impedance shunt is prevented from occurring in the second electronic system.

Furthermore, it is preferably provided that the control unit of the first electronic system is switched into an emergency mode if moisture/liquid has been detected by the sensor device of the second electronic system. As already described above, the emergency mode is in particular carried out for example by taking measures that minimize the effect of a complete failure of the auxiliary torque, so that for example a warning message is produced and the continued operating period is temporally limited.

It is particularly preferably provided that the control unit produces a warning message if liquid is detected by the sensor device of the second electronic system. In particular, the driver of the vehicle comprising the steering system is made aware by the warning message that there is a fault and a visit to a workshop is required. In particular, the driver is made aware that the steering system is in an emergency mode.

The steering system according to the invention with the features of claim 9 is characterized by the device according to the invention. As a result, the already mentioned advantages arise. Further advantages and preferred features arise in particular from the previously described matters and from the claims.

The method according to the invention with the features of claim 10 is characterized in that if liquid or the presence of liquid in/on the second electronic system is detected by the sensor device of the second electronic system, the second electronic system is deactivated and the first electronic system is switched into an emergency mode. This results in the advantages already mentioned above. In particular, it is provided that the emergency mode of the first electronic system and the deactivation of the second electronic system are only carried out if a moisture value/liquid value detected by the sensor device exceeds a specifiable limit value. Further preferred features and advantages arise in particular from the previously described matters and from the claims.

BRIEF DESCRIPTION OF THE DRAWINGS

The disclosure and further advantages are described in detail below using an exemplary embodiment. In the figures

DETAILED DESCRIPTION

Figure 1:
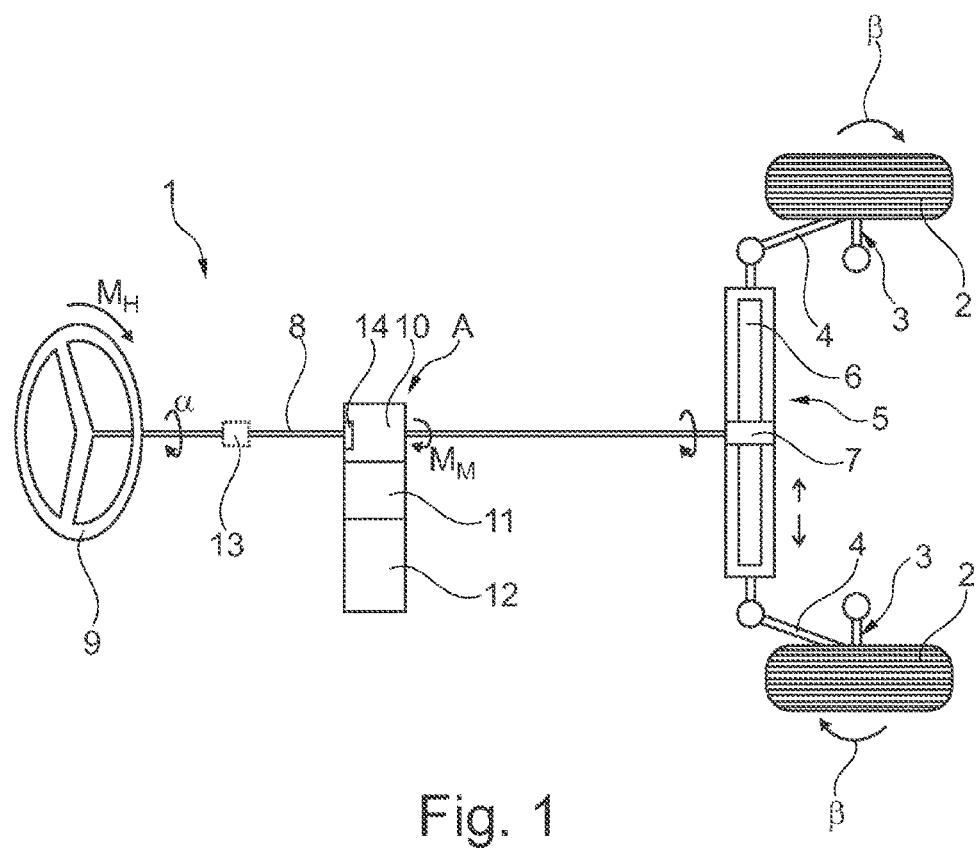
FIG. 1 shows a steering system of a motor vehicle in a simplified representation.

FIG. 1 shows in a simplified representation a power steering system 1 for two steerable wheels 2 of a wheel axle of a motor vehicle that is not represented here in detail. The wheels 2 are each pivotably supported on the motor vehicle by a respective wheel suspension 3. Each of the wheels is moreover connected to a steering gearbox 5 by a respective tie rod 4. The steering gearbox 5 comprises a rack 6 that is coupled at both ends to a respective one of the tie rods 4. A pinion 7 that is engaged with the rack 6 is rotationally fixedly connected to a steering rod 8, which moreover supports a steering control 9 in the form of a steering wheel that can be used by a driver. Once the driver exerts a manual torque $M_H$ on the steering control 9, as shown by a double arrow, in the case of a sufficiently high manual torque on the steering rod 8 the steering wheel turns through an angle α and hence the pinion 7, whereby the rack 6 of the steering gear 5 is displaced and the wheels 2 are swiveled by a steering angle β corresponding to the transmission ratio.

The power steering system 1 is embodied as an electromotive power steering system 1 and for this purpose comprises an electric motor 10 as an actuator A, the rotor of which has a working connection to the steering rod 8. The electric motor 10 comprises power electronics 11 that are actuated by a control unit 12 for operating the electric motor 10. In this case moreover, the control unit 12 detects data of a torque sensor 13, which for example is associated with the steering rod 8, and/or a rotation angle sensor 14, which for example is associated with the steering rod 8 in order to detect the manual torque $M_H$ applied to the steering wheel by the driver. Depending on the detected manual torque $M_H$, the control unit 12 controls the electric motor 10 by means of the power electronics 11 to produce a motor torque $M_M$ that is transferred directly or via a gearbox to the steering rod 8 and is thereby superimposed on the manual torque. The method carried out by the control unit 12 thereby facilitates the driver in controlling the motor vehicle comprising the power steering system 1.

The design of the power steering system 1 presented here is to be considered purely as an example. Of course, the sensors and also the electric motor can be disposed at different points in the power steering system 1.

Figure 2:
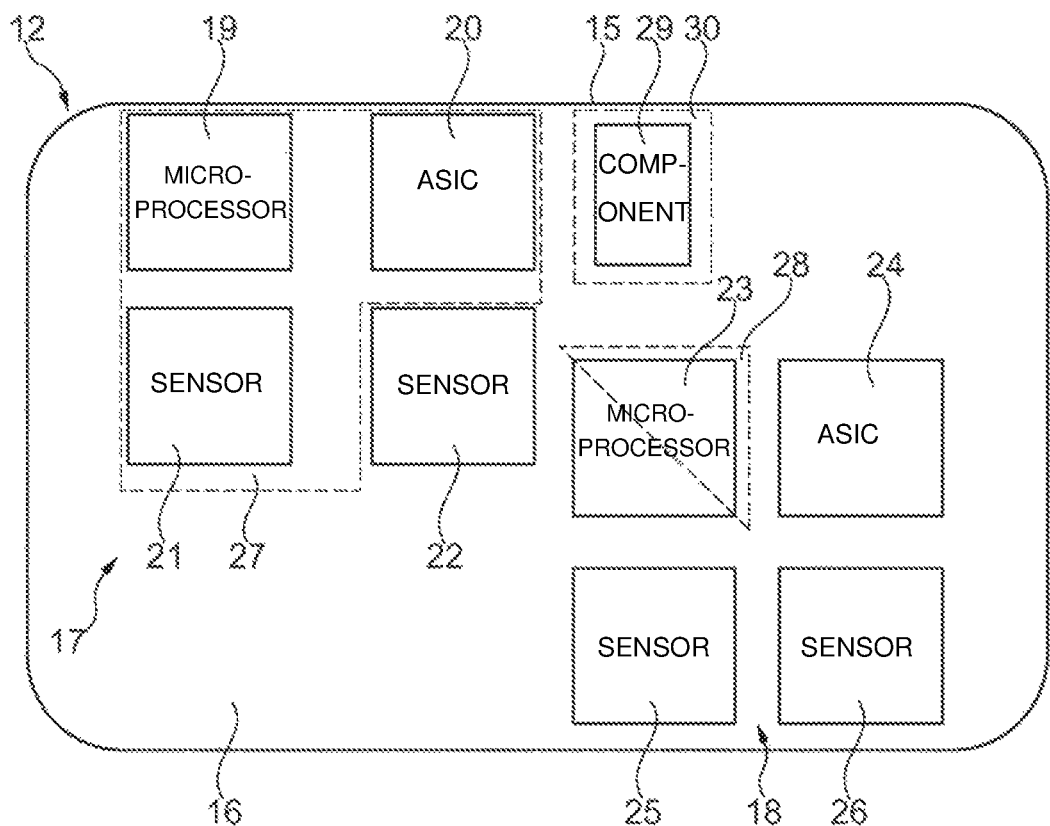
FIG. 2 shows a device for operating the steering system and FIG. 3 shows a method for operating the device and the steering system.

FIG. 2 shows in a simplified representation the control unit 12 in a simplified representation. The control unit 12 carries in a housing 15 a circuit board 16 as a carrier substrate on which a first electronic system 17 and a second electronic system 18 are disposed. The two electronic systems 17 and 18 are embodied identically in the present case and form a redundant system for operating the electric motor 10. The electronic system 17 comprises a microprocessor 19, an application-specific integrated circuit 20 and a first sensor device 21 and a second sensor device 22. The second electronic system 18 correspondingly comprises a microprocessor 23, an application-specific integrated circuit 24 and a first sensor device 25 and a second sensor device 26. The components of the second electronic system 18 are embodied correspondingly to the components of the first electronic system 17.

The microprocessors 19 and 23 are control units of the respective electronic system 17 and 18. The sensor devices 21 and 25 are embodied as moisture sensors that directly detect the presence of moisture. The sensor devices 22 and 26 can also be embodied as moisture sensor devices, but can also for example form or be connected to the torque sensor 13 or rotation angle sensor 14 of the steering system 1. Particularly preferably, the sensor devices 21 and 25 are alternatively embodied as revolution rate sensors, which produce a detectable low-impedance shunt in a timely manner in the presence of moisture/liquid and as a result indicate the presence of moisture/liquid.

The housing 15 protects the electrical/electronic components of the electronic systems 17 and 18 against moisture. In order to ensure continued reliable operation of the control unit 12 even in the event of damage to the housing or in the event of leaking of the housing, in the present case it is provided that the microprocessor 19, the circuit 20 and the sensor 21 of the first electronic system 17 are sealed by a protective coating 27. Furthermore, the microprocessor 23 of the second electronic system 18 is sealed in some areas by a protective coating 28. Otherwise the second electronic system 18 has no protective coating.

In the control unit 12 there is thus an electronic system 17 substantially protected by a protective coating 27 and a substantially unprotected electronic system 18. If moisture penetrates into the housing 15 of the control unit 12, the liquid is prevented from reaching the electrical/electronic component that is protected by the respective protective coating 27, 28. The exposed parts of the electronic system 17, 18 are unprotected, however.

Figure 3:
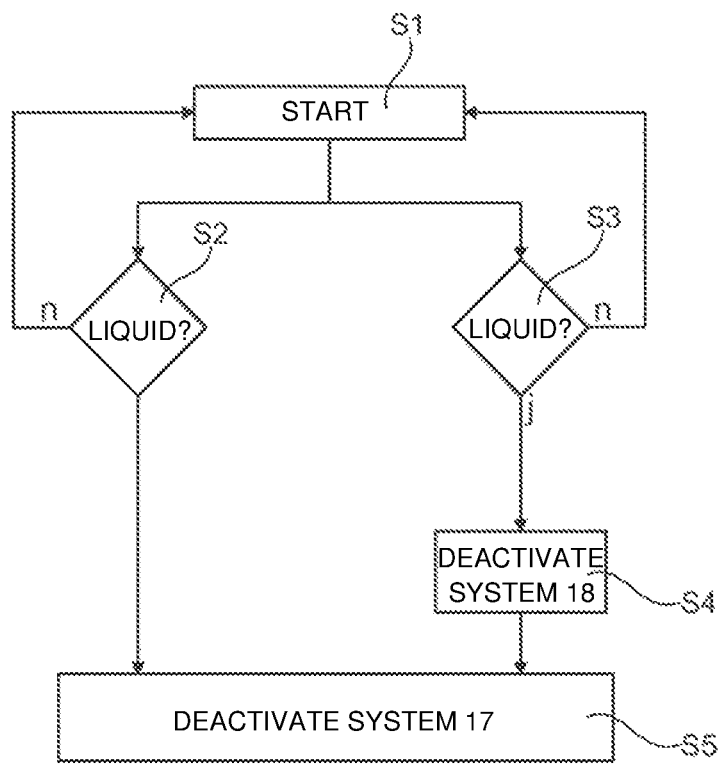

The advantage of said design of the control unit 12 will be described in detail using FIG. 3, which shows a flow chart that describes an advantageous method with which the control unit 12 is to be operated. In the step S1, the control unit is set into operation. Then, the microprocessors 19, 25 or the control units of the electronic systems 17 and 18 monitor the output data of the sensor devices 21 and 25. During this, a query S2 for the electronic system 17 determines whether liquid is detected or not. If no liquid is detected (n), then the process returns to the step S1 and the method is started again. In a query S3, the microprocessor 23 checks in parallel whether there is liquid in the control unit 12 using the output data of the sensor device 25. If the query reveals that no liquid is detected (n), then the process returns to the step S1. In the queries S2 and S3, in this case the moisture value detected by a respective sensor device 21 and 25 is compared with a specifiable limit value to determine the presence of liquid. Only if the detected moisture exceeds the specified limit value is it detected that there is liquid in the control unit 12.

If it is detected that there is liquid in the control unit 12 in the query S3, then in a subsequent step S4 the electronic system 18 is deactivated and optionally the electronic system 17 is switched into an emergency mode. Following the expiry of a specifiable period of time, or if the query S2 reveals that the actual moisture sensor that is protected by the protective coating 27 is now also detecting liquid, the electronic system 17 is also deactivated in a step S5.

Owing to the embodiment described here of the control unit 12 and the associated operating method, it is achieved that in the case of two redundant systems, one responds earlier to the ingress of moisture than the other because of the protective coating 27 that only protects the moisture sensor of the first electronic system 17. Whereas the electronic system 18 is already deactivated, so that short-circuits or low-impedance shunts owing to the liquid in the electronic system 18 are prevented and the steering system 1 can also continue to be operated reliably by the remaining electronic system 17, the first electronic system 17 is only switched off if the sensor device 21 detects that liquid has penetrated into the protective coating 27, or if a specifiable period of time has expired. In particular in this case, the period of time is determined depending on the resistance of the protective coating 27 against the ingress of water. By protecting only one of the two redundant electronic systems 17, 18 against the effects of water, the robustness of the protected electronic system 17 is increased, wherein the unprotected electronic system 18 diagnoses a defect or moisture in the control unit 12 in a timely manner owing to the effects of water. Because of said fault diagnosis in the unprotected electronic system 18, in the protected electronic system 17 at least one measure is preferably taken to minimize or to prevent the effect of a complete failure of the control unit 12 or the electric motor 10. In this case, the electronic system 17 is robustly protected against water ingress by the protective coating 27, so that at least degraded continued operation is possible during the diagnosis time and the preparation of measures. On the other hand, the electronic system 18 is protected less robustly in order to detect liquid ingress in a timely manner and to ensure sufficiently long continued operation of the protected electronic system 17.

For the case in which the electronic systems 17 and 18 share a resource or a component, such as for example the component 29 that is shown in FIG. 2, which is for example an energy storage device or a further sensor, this is advantageously also protected or sealed against moisture by a protective coating 30. The sealing by the protective coating 30 is however optional. In the case of sufficient robustness of the component 29 itself against water ingress, the sealing 30 is not necessary.

Whereas in the present exemplary embodiment the electronic systems 17 and 18 and the components 29 each comprise a dedicated protective coating 27, 30, 28 for sealing, it can also be provided that only one protective coating is provided, by which the electronic systems 17 and 18 and the electronic components 29 are correspondingly sealed. It is also conceivable that the electronic systems 17 and 18 are not disposed on a common or single circuit board 16, but for example on two different circuit boards, but advantageously in the same housing 15.

The invention claimed is:

1. A method for operating a steering system having at least one electrically operated actuator with a device including at least one carrier substrate, a first electronic system, and an at least partly redundant second electronic system, the method comprising:
    deactivating the second electronic system and switching the first electronic system into an emergency mode if a dedicated sensor device of the second electronic system detects liquid
    wherein the first electronic system is disposed on the at least one carrier substrate and is configured to operate the actuator,
    wherein the second electronic system is disposed on the at least one carrier substrate and is configured to operate the actuator,
    wherein the at least one carrier substrate is sealed liquid-tight at least in some areas with a protective coating,
    wherein the first electronic system is at least substantially sealed by the protective coating,
    wherein the second electronic system at least partly has no protective coating, wherein the sensor device has no protective coating, and
wherein the first electronic system includes a dedicated sensor device configured to detect liquid.

2. A device for operating a steering system including at least one electrically operated actuator, the device comprising:
   at least one carrier substrate;
   a first electronic system disposed on the at least one carrier substrate and configured to operate the actuator; and
   an at least partly redundant second electronic system disposed on the at least one carrier substrate and configured to operate the actuator, the second electronic system including a dedicated sensor device, wherein:
   the at least one carrier substrate is sealed liquid-tight at least in some areas with a protective coating;
   the first electronic system is at least substantially sealed by the protective coating;
   the second electronic system at least partly has no protective coating;
   the sensor device has no protective coating and is configured to detect liquid; and
   the first electronic system includes a dedicated sensor device configured to detect liquid.

3. The device as claimed in claim 2, wherein the sensor device of the first electronic system is sealed by the protective coating and the sensor device of the second electronic system has no protective coating.

4. The device as claimed in claim 2, wherein:
   the first electronic system and the second electronic system comprise a commonly used component, and
   the commonly used component is sealed by the protective coating or a further protective coating.

5. The device as claimed in claim 2, further comprising:
   a control unit configured to deactivate the second electronic system if the sensor device detects liquid.

6. The device as claimed in claim 5, wherein the control unit switches the first electronic system into an emergency mode if liquid is detected by the sensor device.

7. The device as claimed in claim 5, wherein the control unit produces a warning message if liquid is detected by the sensor device.

8. A steering system for a vehicle, comprising:
   a steering control connected by a steering gearbox to at least one wheel of the vehicle that can be swiveled;
   an electrically operated actuator configured to produce an auxiliary steering torque acting on the at least one wheel, and
   a device operatively connected to the actuator, the device including
      at least one carrier substrate,
      a first electronic system disposed on the at least one carrier substrate and configured to operate the actuator, and
      an at least partly redundant second electronic system disposed on the at least one carrier substrate and configured to operate the actuator, the second electronic system including a dedicated sensor device,
   wherein the at least one carrier substrate is sealed liquid-tight at least in some areas with a protective coating,
   wherein the first electronic system is at least substantially sealed by the protective coating,
   wherein the second electronic system at least partly has no protective coating, and
   wherein the sensor device has no protective coating and is configured to detect liquid, and
   wherein the first electronic system includes a dedicated sensor device configured to detect liquid.

* * * * *